United States Patent [19]

Reis et al.

[11] Patent Number: 4,725,178

[45] Date of Patent: Feb. 16, 1988

[54] PROGRAMMABLE MANIPULATOR

[75] Inventors: Walter Reis, Obernburg; Karlheinz Langner, Mainaschaff; Udo Pfenning, Obernburg, all of Fed. Rep. of Germany

[73] Assignee: Reis GmbH & Co., Fed. Rep. of Germany

[21] Appl. No.: 834,691

[22] Filed: Feb. 28, 1986

[51] Int. Cl.$^4$ .............................................. B25J 9/00
[52] U.S. Cl. ........................................ 414/4; 414/1; 901/4; 901/5
[58] Field of Search ................. 901/3, 4, 5, 50; 414/1, 414/730, 917, 4, 2

[56] References Cited

U.S. PATENT DOCUMENTS

| | | | |
|---|---|---|---|
| 3,904,042 | 9/1975 | Colston | 414/1 |
| 4,239,431 | 12/1980 | Davini | 901/4 X |
| 4,481,592 | 11/1984 | Jacobs et al. | 901/3 X |
| 4,545,713 | 10/1985 | Beni et al. | 414/1 |

FOREIGN PATENT DOCUMENTS 2435156 12/1976 Fed. Rep. of Germany .
0069435 10/1964 Italy .

Primary Examiner—Robert J. Spar
Assistant Examiner—Jay I. Alexander
Attorney, Agent, or Firm—Kirkpatrick & Lockhart

[57] ABSTRACT

A multi-axle programmable manipulator is described which includes a corresponding multi-axle training arm for programming the manipulator. A support for the training arm is disclosed which allows the training arm to so be anchored to the manipulator that the first axle of the training arm extends constantly in the extension of the first axle of the manipulator. The displacement of the second axle of the training arm is mechanically compensated to be rotatable about the second axis of the manipulator.

4 Claims, 5 Drawing Figures

PROGRAMMABLE MANIPULATOR

BACKGROUND OF THE INVENTION

1. Field of the Invention

The invention relates to a multi-axle programmable manipulator comprising a corresponding multi-axle training arm for programming the manipulator.

2. Description of the Prior Art

Programmable manipulators are nowadays used for a plurality of purposes. For programming, a so-called training arm is employed which, as concerns its axles, dimensions etc, is, on principle, identically constructed as is the manipulator. The training arm is then brought to that location where, later on, the manipulator proper will be, and the corresponding movements are performed at the training arm whereby the program is written. This program is later on executed by the manipulator when it is mounted on the site and the manipulator will then execute all the movements according to the program.

This principle has proved to be functionable. It is however complicated to handle insofar as the manipulator has first to be disassembled and only then can the training arm be set up on its place. In this connection, utmost care must be taken that the base of the training arm rests at exactly the same location as the base of the manipulator, otherwise the displacement has to be considered in the program.

It is also possible to leave the manipulator where it is and to erect the training arm by its side, whereby the displacement between the manipulator and the training arm has of course to be taken into consideration. Such a procedure is however possible only if the manipulator does not interfere with the movements of the training arm.

It is therefore a disadvantage of all prior art procedures that the manipulator is guided by a program which includes errors, if namely the displacement between the manipulator and the training arm is not exactly taken into consideration; and it constitutes also an additional expenditure of energy because of the repeated mounting and demounting of the manipulator and of the training arm as well as of the additional inputs into the program for the consideration of the displacement.

SUMMARY OF THE INVENTION

The present invention avoids these disadvantages. The aim is to provide a manipulator of the kind mentioned above, where the respective training arm forcedly passes through positions which are identical with the positions of the manipulator.

To solve this problem, the invention is characterized in that the training arm may so be anchored to the manipulator that the first axle of the training arm extends constantly in the extension of the first axle of the manipulator and that the displacement of the second axle of the training arm effected by this anchorage is mechanically compensated for relative to the second axle of the manipulator on the training arm.

The manipulator is erected on the location desired, its arm which carries the second and following axles is turned so that these elements are no longer in the way and then the training arm is secured to that element of the manipulator on which the first axle is formed. When erecting the manipulator on the ground, this will be the vertical axle. The training arm is thus anchored at a defined point on the manipulator this point so being selected that the two first axles of the manipulator and of the training arm coincide. In these first axles, therefore, there is no displacement between the two portions. For constructional reasons however it is not possible to provide the second axle of the training arm coinciding with the second axle of the manipulator because otherwise the two first axles of the two elements could not coincide. In order to compensate for the constant displacement caused thereby, a corresponding mechanical, and hence constantly and automatically effective, compensation has been provided for.

In connection with this compensation, two possibilities are preferred. The first one is characterized in that a parallelogram structure is provided on the first axle of the training arm carrying a connecting piece on which the third axle is formed and which compensates for the displacement.

The second possibility is characterized in that to the first axle of the training arm a yoke is secured on which the second axle of the training arm is formed in an extension of the second axle of the manipulator.

The training arm may also separately be used from the manipulator because the training arm need include only suitable anchoring means at its base for anchoring the training arm to the manipulator. A further embodiment is therefore characterized in that a framework is provided on which the training arm may be anchored at a height which corresponds to the height of the anchoring point on the training arm of the manipulator. The training arm may therefore be employed without any additional provisions separate from the manipulator for programming whereby care is taken by the features disclosed that the training arm is on the same height on the framework as on the manipulator so that no additional height displacement has to be taken into consideration.

In order to make calibration of the training arm easier, it is further preferred that the construction element of the training arm which in the succession of the axles is the last one may be releasably anchored in a defined position on the base of the training arm. In this defined position, therefore, all axles and construction elements of the training arm display a defined and reproducible position starting from which programming may be initiated. This may be called the program zero position.

In the following, the invention will be explained in more detail based on exemplified embodiments, from which further important features may be taken.

DETAILED DESCRIPTION OF THE PREFERRED EMBODIMENTS

Figure 1:
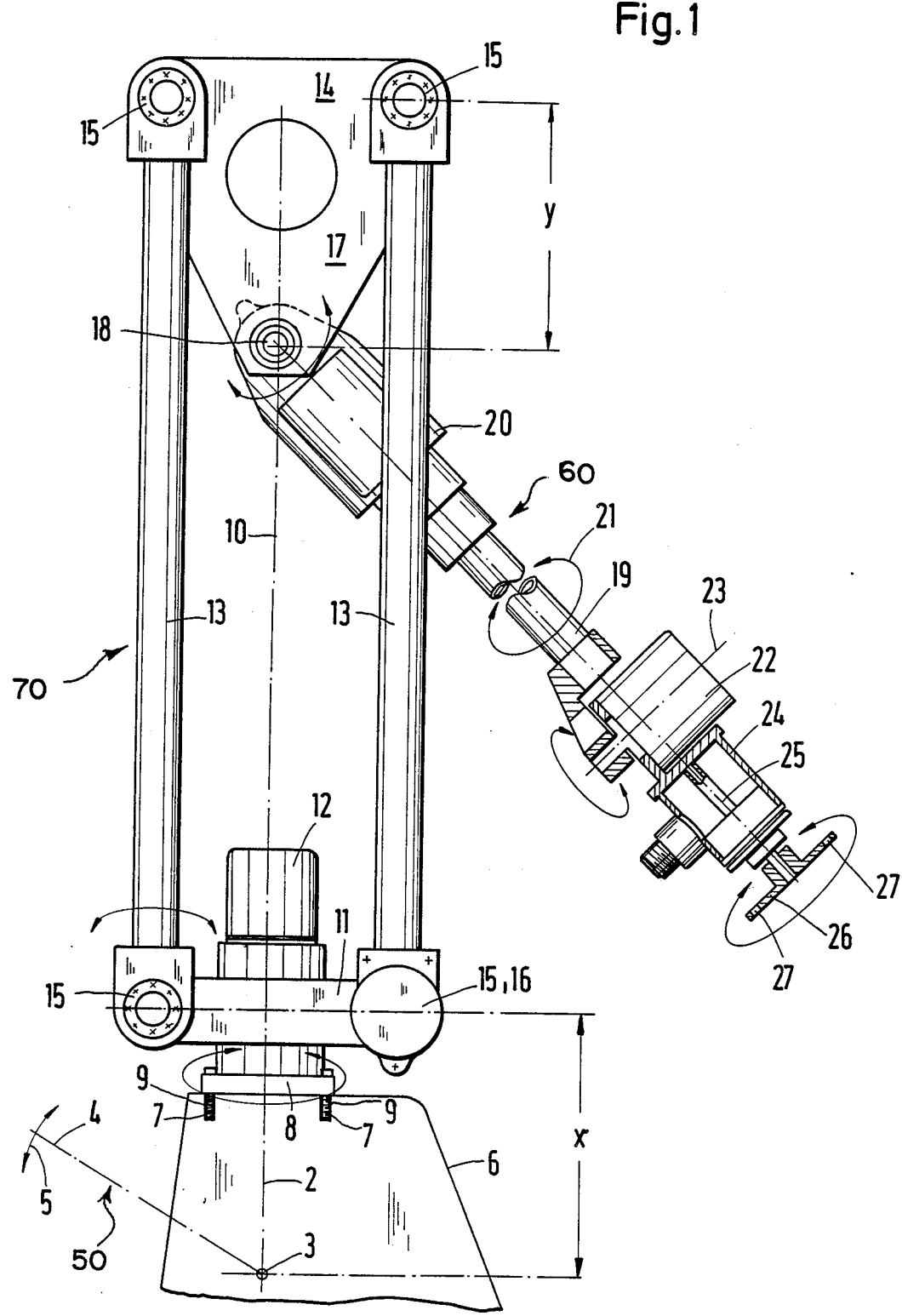
FIGS. 1 and 1A are views of the training arm with an indication of the anchorage on that construction element of the respective manipulator on which the first (vertical) axle is formed.
Figure 1A:
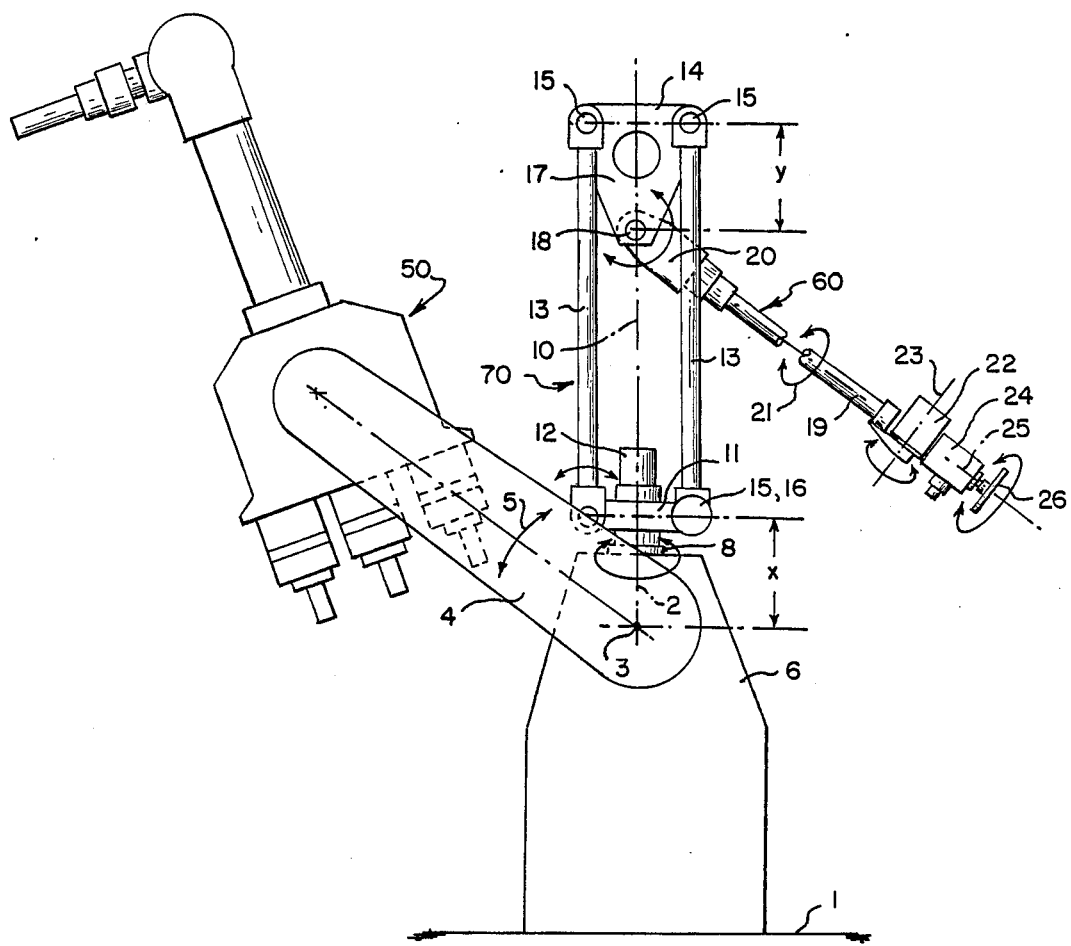

It should be noted in the beginning that the manipulator 50 of FIG. 1 is shown only in a portional view; it is on principle built up with the same axles as the training arm, generally 60, as described in the following.

The manipulator 50 stands on a ground 1 (compare also FIG. 3), where it is provided with a first vertical axle 2. A second axle 3 of the manipulator 50 extends in a perpendicular relation thereto. Indication is made, in FIG. 1, to a swivel arm 4, which can be swiveled around the second axle 3 in the direction of arrow 5.

The first axle 2 is formed on a construction element 6 of the manipulator 50 which is mounted, swivelably about the first axle 2 on a bottom plate, on the ground.

On the upper side of element 6, a defined anchorage point for a training arm 60 is provided. This may for instance be effected by clamp bolts 7 which are anchored at a bottom plate 8 of the training arm 60 and which may be secured at defined locations in corresponding blind holes 9 of element 6. This anchorage is so formed that a first axle 10 of the training arm 60 coincides with the first axle 2 of the manipulator 50.

On bottom plate 8 of the training arm 60, a plate 11 is provided which may be swiveled by a motor 12 about axle 2, 10 to bottom plate 8.

Plate 11 constitutes part of a parallelogram structure, generally 70, comprising rods 13 and an upper connection rod 14. At the four corners of this parallelogram structure 70, joints 15 are provided via which the parallelogram structure 70 may horizontally be swiveled. One of the joints is provided with a motor 16.

The upper connection rod 14 constitutes part of a substantially triangular connecting piece 17 on which a third axle 18 is formed. In this axle, a hinged arm 19 of the training arm 60 is rotatably secured. It is rotatable by means of a motor 20 to form a fourth axle 21.

At the end of hinged arm 19, a further motor 22 is provided to form a fifth axle 23. At this one, a motor 24 is secured which forms a sixth axle 25. At the end of this arm, finally, element 26 is provided, which is for instance formed as a disc and to which a tool may be secured. The disc 26 has at least two holes 27.

FIG. 1 shows that between the second axle 3 of the maniplator 50 and the second axle 15, 16 of the training arm 60, there is a displacement X. In order to compensate for this displacement, an identical displacement Y between the upper joints 15 of the parallelogram structure 70 and the third axle 18 is provided.

If now the parallelogram structure 70 is swiveled from the vertical position as shown, axle 18 performs a movement which is identical to the movement which it would perform if axle 18 were secured to a hinged arm the lower rotation point of which could coincide with axle 3. Thereby, it can be taken that, by the arrangement shown, the height displacement X is compensated for by the height displacement Y.

Figure 2:
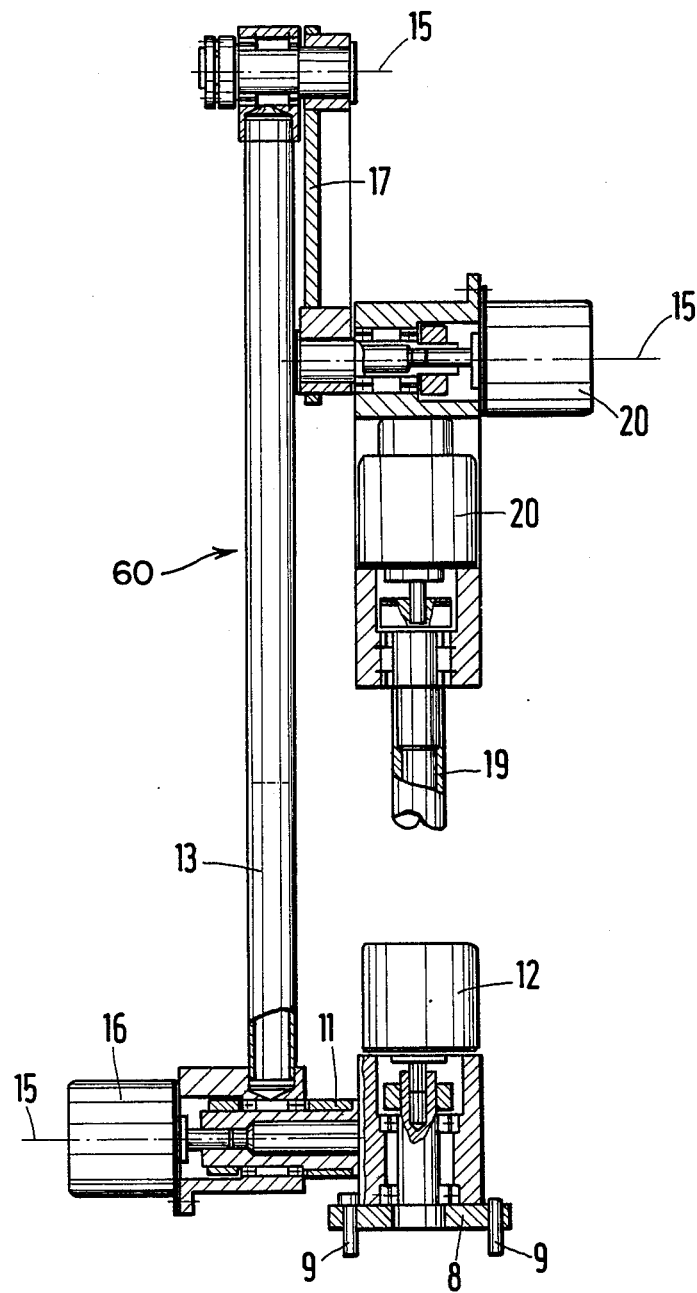
FIG. 2 is the training arm according to FIG. 1 in a view turned about 90 degrees relative to the first one.
Figure 3:
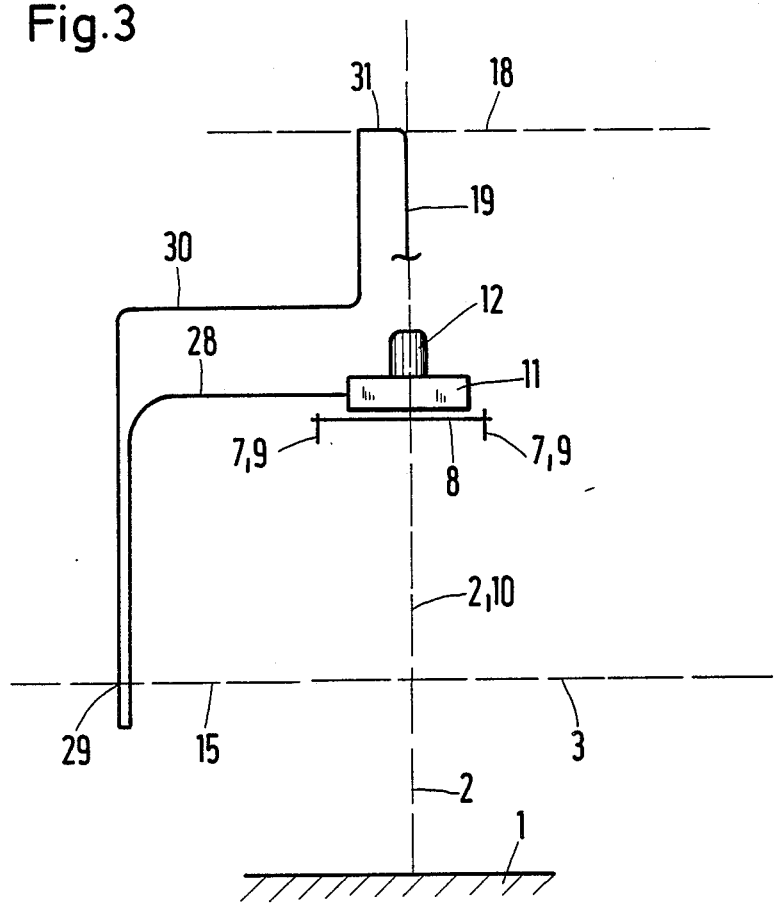
FIG. 3 is a schematic view corresponding to FIG. 2 in an altered embodiment to compensate for the displacement.

FIG. 3 shows an alternative arrangement where on plate 11 a yoke 28 is secured which is guided laterally to the side of element 6 to the second axle 3. It is at this location where the second axle 15 of the training arm 60 on this yoke 28 is formed, and at this joint 29 of the yoke which coincides with axles 3, 15, a rod 30 engages, at the upper end of which the third axle 18 is formed. At this location, a connecting piece 31 is provided connecting those joints with one another which connect rod 30 and the hinged arm 19 connected thereto. The further structure after hinged arm 19 is the same as described above in connection with FIGS. 1 and 2.

One can therefore see that yoke 28 effects that axle 15 coincides with axle 3 as, of course, does axle 2 with axle 10. The yoke 28 circumpasses element 6, and more motors or similar apparatus flanged thereto.

The manipulator 50 as well as the training arm 60 include the common coding elements, angle-measuring instruments, and so on.

Figure 4:
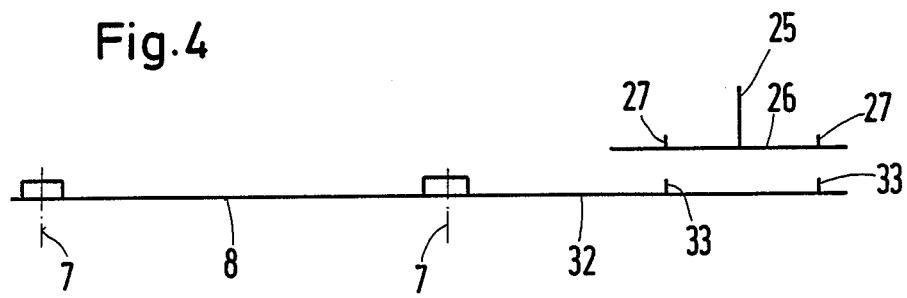
FIG. 4 is a schematic view of the releasable anchorage of the last element of the training arm on its base.

FIG. 4 shows that an arm 32 is secured to bottom plate 8 which laterally projects from the bottom plate 8. On the upper side of the arm, two pins 33 are secured thereto the distance of which corresponds to the distance of the holes 27 of the element 26. Element 26 may thus releasably be anchored relative to bottom plate 8 of the training arm 60 and together with it all other elements of the supporting arm as well.

The training arm 60 described including its anchorage at the manipulator 50 therefore constitutes a multi-axle kinematic replacement model of the manipulator 50, manufactured in a light-weight construction comprising arms swivelling independently from each other. In addition, it includes a handle, not shown on the drawing, including integrated servicing elements for initiating the operation. The adaptation of the training arm 60 directly on the rotation point of the first axle 2 of the manipulator 50 avoids complicated computing procedures and additional irregularities between the contour passed by means of the training arm 60 and the path passed by the manipulator 50. The training arm 60 may also be used contrary to a separate scaffold, without any additional efforts in case of overhead installation of the manipulator 50 or in any other position. The manipulator 50 need not be removed from its normal site for programming. Only its main axles have to be swung out from the operation space. The kinematics of the training arm 60 is so formed that it mechanically compensates for the displacement of the axles between the manipulator 50 and the training arm 60. The movement of the tool center between the manipulator 50 and the training arm 60 is analoguous although the rotation point of the second axle of the training arm 60 is not identical to the rotation point of the industrial manipulator 50. Calibration of the training arm 60 may finally be obtained by means of the mechanical gauge according to FIG. 4, by which all axles are in their mechanical zero position at the same time. Separately, the training arm 60 may be used for programming either on the manipulator 50 or on a particular structure having the same height dimensions as the flange point on the manipulator 50.

The actual position of the first axle 2 of the manipulator 50 is known at any time and may correspondingly be computed so that the position of the first axle 2 is not important.

FIG. 2 in particular shows that also the axle of hinged arm 19, i.e. the sixth axle 25, may be swiveled in a plane defined by axles 2, 3.

It is obvious that in the programming process only small amounts of inactive material have to be moved by the programmer as is a general characteristic of training arms. The positions covered by the training arm 20 and by the manipulator 50 are nevertheless identical. Programming may be performed by means of a computer assigned to this unit only, for instance by means of a Personal Computer so that a main processor, if any, is not used for programming (offline process). The programming data are later on fed into the main processor.

Of particular importance is that feature of the present invention according to which programming in case of a separately erected training arm is possible, simultaneously and in parallel relative to the processes controlled by the main processor.

What is claimed is:

1. A support for a multi-axis training arm having a free end and a first end, said training arm being used for programming a corresponding multi-axis programmable manipulator, said manipulator having an unattached end and another end which is mounted on a base at a fixed elevation above ground and is mounted on said base so as to provide a first axis of rotation for said programmable manipulator perpendicular to ground and a second axis of rotation of said manipulator perpendicular to said first axis, said support comprising:
   a. pivotal support means mounted on said base and having a primary axis colinear with said first axis of said manipulator; and
   b. means for movably mounting said first end of said training arm on said pivotal support means, said means for mounting being configured so as to provide an additional axis of rotation for said training arm parallel to said second axis of said manipulator, said additional axis being pivotable by said means for mounting about a secondary axis which is colinear with said second axis of said manipulator.

2. Apparatus of claim 1 in which said means for mounting comprises:
   a. a first link mounted on said pivotal support means, the axis of said first link extending perpendicular to said first axis, the axis of said first link being displaced at a first distance from said second axis with said first distance being measured along said first axis;
   b. two parallel second links of equal length each pivotally attached at one end thereof to the opposing ends of said first link;
   c. a third link of equal length to said first link and pivotally attached at the opposite ends thereof to the other ends of said second links, said third link having an extended portion thereof extending toward said base; and
   d. an axle for supporting said training arm, said axle being provided on said third link, said axle being parallel to said second axis and being mounted on said extended portion at a perpendicular distance below the center of the line passing between the ends of said second links attached to said third link equal to said first distance.

3. Apparatus of claim 1 further comprising a framework separated from said base on which said first end of said training arm may be anchored at said fixed elevation above ground.

4. A support for a multi-axis training arm having a free end and a first end, said training arm being used for programming a corresponding multi-axis programmable manipulator, said manipulator having an unattached end and another end which is mounted on a base at a fixed elevation above ground and is mounted on said base so as to provide a first axis of rotation of said manipulator perpendicular to ground and a second axis of rotation of said manipulator perpendicular to said first axis, said support comprising:
   a. pivotal support means mounted on said base and having a primary axis colinear with said first axis; and,
   b. means for movably mounting said first end of said training arm on said pivotal support means, said means for mounting being configured so as to provide an additional axis of rotation of said training arm parallel to said second axis of said manipulator, said additional axis being pivotal by said means for mounting about a secondary axis which is colinear with said second axis of said manipulator, said support means further comprising:
      (1) a first link mounted on said pivotal support means, the axis of said first link extending perpendicular to said first axis, the axis of said first link being displaced at a first distance from said second axis with said first distance being measured along said first axis;
      (2) two parallel second links of equal length each pivotally attached at one end thereof to the opposing ends of said first link;
      (3) a third link of equal length to said first link and pivotally attached at the opposite ends thereof to the other ends of said second links, said third link having an extended portion thereof extending toward said base; and,
      (4) an axle for supporting said training arm, said axle being provided on said third link, said axle being parallel to said second axis and being mounted on said extended portion at a perpendicular distance below the center of the line passing between the ends of said second links attached to said third link equal to said first distance.

* * * * *